Figure 1:
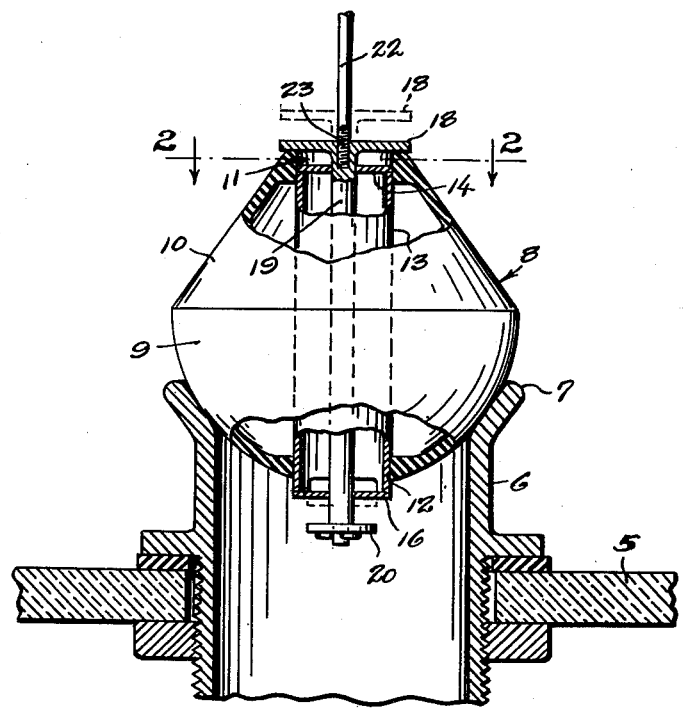

June 13, 1950        B. ROSELAIR        2,511,545

FLUSH VALVE FOR TOILET TANKS

Filed June 2, 1947

INVENTOR.
Bert Roselair
BY
ATTORNEYS.

Patented June 13, 1950

2,511,545

UNITED STATES PATENT OFFICE 2,511,545

FLUSH VALVE FOR TOILET TANKS

Bert Roselair, Snoqualmie, Wash.

Application June 2, 1947, Serial No. 751,786

2 Claims. (Cl. 4—56)

This invention relates to certain new and useful improvements in flush valves for toilet tanks.

In toilet tanks, it is customary to provide a ball valve to close the outlet from the tank to a toilet bowl and these ball valves are usually constructed of comparatively soft rubber to effect a tight seat on the tank outlet, and these ball valves being of soft rubber, are subjected to considerable compressive force of the head of water in the tank and by their tight seating on the outlet considerable force is required to unseat the valve and distortion of the soft rubber ball valve results during the unseating of the valve, all working to shorten the life of the valve.

It is therefore the primary object of the present invention to eliminate the foregoing characteristics of the type of flush valve described and to provide a flush valve that is still formed of the usual relatively soft rubber material and to so construct the valve that upon initial movement of the lift rod to unseat the valve, a small quantity of water is permitted to flow through the valve and equally from the tank and thereby relieve the excessive compressive force of the head of water in the tank on the flush valve and to facilitate unseating of the valve without undue distortion thereof.

A further object of the invention is to provide a ball valve for flush tanks of the foregoing character wherein the soft rubber ball has axial openings in the top and bottom sides thereof for the mounting of an open ended cylinder with a valve at the upper end of the cylinder in normally closed relation thereto and adapted to be unseated by the usual lift rod of the tank flushing mechanism, whereby a small quantity of water may initially flow through the ball valve and from the flush tank to the hopper prior to the complete unseating of the ball valve relative to the flush tank outlet.

With the above and other objects in view that will become apparent as the nature of the invention is better understood, the same consists in the novel form, combination, and arrangement of parts hereinafter more fully described, shown in the accompanying drawing, and claimed.

Figure 2:
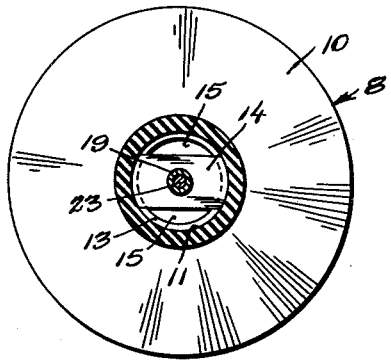
Figure 3:
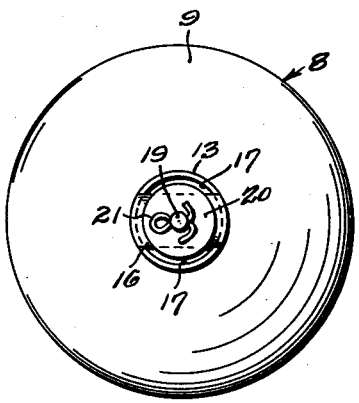

In the drawing:

Figure 1 is a side elevational view, partly in section, of a float valve for toilet flush tanks, the latter with its outlet being fragmentarily illustrated in section, Figure 2 is a cross-sectional view taken on line 2—2 of Figure 1, and Figure 3 is a bottom plan view of the float valve.

As illustrated in Figure 1, a part of the bottom wall 5 of a flush tank is shown with the sealtight outlet fitting 6 set therein and leading to a toilet bowl with the fitting 6 carrying at its upper end the usual flared valve seat 7 for the mounting of the float valve 8.

The float valve 8 is constructed of the usual material, such as soft rubber or the like, and includes a spherical bottom portion in an upper frusto-conical portion 10. As illustrated in Figure 1, relatively large central openings 11 and 12 are formed in the upper and lower ends of the valve 8 for the mounting of the tubular member 13 that may be formed of any rigid material desired, such as metal, plastic or the like, the upper end of the tubular member 13 terminating below the extreme upper end of the valve 8, while the lower end thereof projects below the lower end of the said valve. As shown in Figures 1 and 2, the upper end of the tubular member 13 is provided with a cross strap 14 defining passages 15 at opposite sides thereof. As shown in Figures 1 and 3, the lower end of the tubular member 13 carries a cross strap 16 providing side openings 17.

A disk valve 18 seats on the upper end of the ball valve 8 to close the opening 11 and the disk valve carries an elongated depending stem 19 slidably extending through the cross straps 14 and 16 to be guided thereby and terminates below the lower cross strap 16 for the reception thereon of a stop washer 20 retained in position by the cotter 21. As shown in Figure 1, the lift rod 22 of the flushing mechanism for the tank is threaded at its lower end as at 23 for attachment to the disk valve 18 and upper end of the stem 19.

As shown by full lines in Figure 1 the disk valve 18 is in its closed position over the opening 11 at the upper end of the ball valve 8 with the stop washer 20 on the lower end of the stem 19 disposed some distance below the lower cross strap 16 of the tubular member 13. In the operation of the float valve 8, the lift rod 22 is first elevated to unseat the disk valve 18 and then moves the same to the dotted line position, such movement being limited by the engagement of the stop washer 20 at the lower end of the depending stem 19 with the lower cross strap 16 of the tubular member, and while in the position illustrated, the float valve 8 remains on its seat 7, controlling the main outlet from the flush tank to the hopper while water in the tank is permitted to flow through the tubular member 13 by way of the unseated valve 18, thereby relieving excessive compressive force on the float valve 8 and permitting a natural and easy unseating of the ball valve upon continued upward movement of the lift rod 22. It will be understood that upon relief of pressure on the operating handle of the flush tank mechanism, the lift rod 22 automatically lowers and permits the disk valve 18 to close the opening at the upper end of the float valve 8 and at the proper time the float valve normally returns to its seat 7 to seal the outlet from the flush tank.

While there is herein shown and described the preferred embodiment of the invention, it is nevertheless to be understood that minor changes may be made therein without departing from the spirit and scope of the invention as claimed.

What is claimed as new is:

1. In combination with the lift rod for the flush valve of a toilet tank, and with a hollow ball of comparatively soft rubber composition arranged to seat on the outlet of said tank, the wall of said ball being thickened at the top and bottom and having axially aligned openings in said thickened portions, a rigid tubular member closely fitting said aligned openings with the upper-end limit located below the top-limit of the ball, an auxiliary disc valve connected to said lift rod and formed to a diameter exceeding the diameter of said openings, said disc valve being arranged to normally seat directly upon the rubber for closing said top opening and provided with a stem depending from said disc valve and passing axially through the tubular member, centrally apertured cross-straps made integral with the tube and extending diametrically thereof at the top and bottom of the tube to guide the stem, and means carried by the lower end of said stem and by engagement with the bottom one of said cross-straps acting to limit elevational movement of the valve.

2. In combination with the lift rod for the flush valve of a toilet tank, and with a hollow ball of comparatively soft rubber composition arranged to seat on the outlet of said tank, the wall of said ball having axially aligned openings in the top and bottom thereof, a rigid tubular member closely fitting said aligned openings with the upper-end limit located below the top-limit of the ball, an auxiliary lift valve connected to said lift rod and formed to a diameter exceeding the diameter of said opening, said valve being arranged to normally seat directly upon the rubber for closing said top opening and provided with a stem depending from said valve and passing axially through the tubular member, centrally apertured cross-straps made integral with the tube, and extending diametrically thereof at the top and bottom of the tube to guide the stem, and stop means carried by the stem and by engagement with one of said cross-straps acting to limit elevational movement of the valve.

BERT ROSELAIR.

REFERENCES CITED

The following references are of record in the file of this patent:

UNITED STATES PATENTS

| Number | Name | Date |
|---|---|---|
| 580,034 | Brogan | Apr. 6, 1897 |
| 957,029 | Bassett et al. | May 3, 1910 |
| 1,374,655 | Harroun | Apr. 12, 1921 |
| 1,632,631 | Smith | June 14, 1927 |
| 2,181,900 | Langdon | Dec. 5, 1939 |